(12) United States Patent
Mori et al.

(10) Patent No.: US 6,392,676 B1
(45) Date of Patent: May 21, 2002

(54) METHOD AND SYSTEM FOR DISPLAYING A MOUSE POINTER

(75) Inventors: Hidetoshi Mori, Yamato; Satoru Yamada, Kochi; Eiki Shibata, Yokohama, all of (JP); Steven C. Ihde, Scotts Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,285

(22) Filed: Mar. 9, 2000

(30) Foreign Application Priority Data

Mar. 11, 1999 (JP) .......................................... 11-065070

(51) Int. Cl.[7] ................................................ G09G 5/08
(52) U.S. Cl. ...................... 345/861; 345/859; 345/163
(58) Field of Search ................................. 345/156, 157, 345/163, 856–862

(56) References Cited

U.S. PATENT DOCUMENTS

| | | | | |
|---|---|---|---|---|
| 5,287,448 A | * | 2/1994 | Nicol et al. .................. | 345/707 |
| 5,867,144 A | * | 2/1999 | Wyard ......................... | 345/769 |
| 6,118,449 A | * | 9/2000 | Rosen et al. ................. | 345/861 |
| 6,166,718 A | * | 12/2000 | Takeda ........................ | 345/419 |
| 2001/0045940 A1 | * | 11/2001 | Hansen ........................ | 345/158 |

* cited by examiner

Primary Examiner—Kent Chang
(74) Attorney, Agent, or Firm—Bracewell & Patterson, LLP; George E. Grosser

(57) ABSTRACT

A method and system for displaying a mouse pointer for use with a three-button mouse, whereby a user is notified that a button has been erroneously depressed. Detectors detect an external force applied to a third button. A mouse function determiner uses the detection results to determine a pertinent function allocated to the third button. A mouse pointer shape determiner, in turn, uses the determination results to determine a shape of a mouse pointer corresponding to the pertinent function. In response to the external force, the shape of the mouse pointer currently being displayed is changed. Thus, through visual feedback a user can be apprized of the fact that an external force has been applied to the third button. This will, in turn, notify the user when the wrong button has been depressed.

22 Claims, 6 Drawing Sheets

METHOD AND SYSTEM FOR DISPLAYING A MOUSE POINTER

BACKGROUND OF THE INVENTION

1. Technical Field

The present invention relates to a method for displaying a mouse pointer.

2. Description of the Related Art

Pointing devices are used to indicate locations on computer screens and of the available pointing devices, the most popular is the mouse. Since a mouse is small and light and provides excellent results, it is ideal for use with an operating system (OS) or "application" programs under a GUI (Graphical User Interface).

With the Internet is expanding rapidly, day by day, the amount of information available on it increases drastically. As a result, users of the Internet must be prepared to process an enormous quantity of data within a relatively short period of time. To improve the conditions under which such processing is performed, enhanced functions have been added to the mouse to improve its efficiency.

An example of an enhanced mouse is shown in FIG. 5.

FIG. 5(a) is a top view of the mouse and FIG. 5(b) is a side view. A mouse 1 includes a main body 2, a left button 3 and a right button 4, which are formed on a portion of the main body 2, and a ball 5 that projects downward from the bottom of the main body 2. This arrangement corresponds to that of a conventional mouse. The enhanced mouse 1, however, also includes a wheel 6 positioned between the left button 3 and the right button 4. The wheel 6 is a disk generally small enough that it can be manipulated by using a finger. The wheel 6 cannot only be rotated forward and backward, but can also be depressed.

FIG. 6 illustrates a window 11 opened on a computer screen. A document 12, including sentences and figures, is displayed in the window 11 (in FIG. 6, the portions of the document 12 that are not actually displayed, i.e., the portions identified by N and S, are also shown). Since there are many lines in the document 12, only some of them are displayed in the window 11.

To read a portion of the document 12 that is not displayed in the window 11 at the present time, a scroll bar 13 is used. The scroll bar 13 has a scroll arrow 14 at its top end and a scroll arrow 15 at its bottom end. In order to scroll the display in the window 11 (to scroll up), while the mouse pointer (an arrow that moves across the screen according to the movement of the mouse and is also called a mouse cursor) is positioned on the scroll arrow 15, the left button 3 (or the right button 4) of the mouse is clicked (the mouse button is quickly depressed and released, one time). Normally, in response to a single click, the document 12 is scrolled up one line. That is, e.g., in FIG. 6, the document 12 is moved up one line from "S" toward "IN." To scroll multiple lines at one time, a scroll box 16 in the scroll bar 13 is used. With the mouse pointer positioned on the scroll box 16, the left button (or the right button) of the mouse is depressed. While the mouse button is held down, the mouse is moved and the scroll box 16 is shifted (downward). Then, in accordance with the distance the scroll bar 16 has been moved, the document 12 moves upward from "S" toward "N." As a result, multiple lines are scrolled up in the window 11.

Although only the scrolling-up operation has been explained, the scrolling-down operation is performed in the same manner. It should be noted that the scroll arrow 14 at the top end of the scroll bar 13 is used for scrolling down, and that when the scroll box 16 is used, the mouse 1 is used to move it upward. As is described above, to scroll the document 12, the mouse pointer has to be moved and positioned on one of the small scroll arrows 14 and 15, and this is a tiresome operation. So to obviate the need for such an operation, the enhanced mouse 1 in FIG. 5 was introduced.

The manner in which the enhanced mouse 1 in FIG. 5 is manipulated will now be described with reference to FIG. 6. First, a mouse pointer 17 is positioned in the window 11 as is shown in FIG. 6. While the mouse pointer 17 is held stationary, the wheel 6 of the mouse 1 is, e.g., rotated backward causing the document 12 to move upward from "S" toward "N." Each rotation of the wheel 6 is divided into a predetermined number of steps and the number of lines to scroll the document 12 in each step can be typically set by using the control panel of the OS. Normally, a scrolling distance of three lines is employed.

Also allocated to the wheel 6 are functions other than scrolling, e.g., a data zoom function, which can be practically and conveniently used on the Internet for so-called net surfing, during which many pages on many Web sites are scanned. To effectively use a WWW (World Wide Web) browser for this purpose, a mouse must frequently be moved and used to click on a "back" or a "forward" button, and manipulating a mouse in this manner is a very tiresome task. But when the data zoom function is used, only the manipulation of the wheel 6 is needed to implement the "back" and "forward" functions. Since no movement of the mouse is required, a user can more fully enjoy net surfing.

As is described above, since the wheel 6 is provided for the mouse 1 in FIG. 5, compared with a conventional mouse, its operational capability is considerably improved. However, there are many shortcomings that have not yet been resolved. One of these limitations is the possibility that the wrong button will be depressed. The mouse 1 shown in FIG. 5 is generally called a three-button mouse because the wheel 6 can be effectively utilized not only by rotating it, but also by depressing it. There are conventional mice that have non-rotary head third buttons instead of wheel 6. Generally, the third button on a three-button mouse is located between the left button and the right button. The right button as well as the left button of a mouse are both frequently utilized in current OSs. As a result the third button may be mistaken for either the left or the right button and depressed erroneously.

To resolve this problem, a method is provided whereby the shape of a mouse pointer is varied when the third button is depressed. An example of a mouse for which this method has been used is the IntelliMouse (Trademark) by Microsoft Corp., a description of the operation of which follows. It should be noted that the IntelliMouse is provided with a wheel instead of a third button, analogous to the mouse in FIG. 5, but that in the following description the wheel is called the third button. First, an explanation will be given for an automatic scroll mode in which automatic scrolling of a document is performed. In this mode, automatic scrolling of the document is initiated by clicking the third button once and moving the mouse (rotating the ball). The scrolling speed is proportional to the distance the mouse is moved. Therefore, if the mouse is moved only a little to reduce the scrolling speed, the document will be scanned slowly. Because of this, the automatic scroll mode is also called a reading mode.

A shape of the mouse pointer provided for the IntelliMouse in the automatic scroll mode is changed as follows.

When the third button (wheel) is depressed, an original shape of the mouse pointer is varied. Then, when the third button is released (i.e., when it is clicked) and the mouse has not been moved (the ball has not been rotated), the Intelli-Mouse enters the automatic scroll mode. Subsequently, when the mouse is moved (the ball is rotated), scrolling of the document is initiated. This scrolling continues even after movement of the mouse has ceased. That is, automatic scrolling of the document is performed. In the automatic scroll mode, the varied shape of the mouse pointer is maintained. However, when the third button is again clicked, the automatic scrolling of the document is halted. At the same time the shape of the mouse pointer returns to its original shape.

The automatic scroll mode must be supported by an application program to make it work. Therefore, in a window wherein an application program is executed that does not support this mode, the shape of the mouse pointer cannot be changed even when the third button is depressed. This point will be specifically explained while referring to FIG. 7. In FIG. 7, windows 22, 24 and 26 are opened on a desktop 21. Since window 22 includes a scroll bar 23, it is a scrollable window. For the same reason, window 24 is a scrollable window. However, since window 26 does not include a scroll bar 23, it is an unscrollable window.

Assuming that an application program that supports the automatic scroll mode is executed in window 22 and an application program that does not support this mode is being executed in window 24. When the mouse pointer is moved to window 22 and the third button is clicked, the automatic scroll mode is initiated. Then, while the current condition of window 22 is maintained, the mouse pointer is moved to window 24 and the third button is clicked. However, since an application that does not support the automatic scroll mode is being executed in window 24, the shape of the mouse pointer does not change because the automatic scroll mode cannot be started in response to clicking of the third button. Therefore, if a window wherein the automatic scroll mode can be executed and a window wherein the automatic scroll mode cannot be executed are open on the same screen, a user may become confused.

Next, the panning mode will be described. The panning mode is a mode wherein a document can be sequentially scrolled in an arbitrary direction at an arbitrary speed by moving the mouse (rotating the ball) while keeping the third button depressed. When the third button is released this mode is terminated. However, since a user can scroll a document at a preferred speed, the user can use this mode to quickly locate a desired area. The mouse pointer for the IntelliMouse in the panning mode is changed as follows. When the third button is depressed, an original shape of the mouse pointer is changed, and the changed shape of the mouse pointer is maintained even when the document is scrolled by moving the mouse. When the third button is released, the panning mode is terminated and the mouse pointer returns to its original shape.

The panning mode, as well as the automatic scroll mode, must be supported by an application program. Therefore, the panning mode has the same shortcoming as with the automatic scroll mode, discussed earlier. That is, when the mouse pointer is moved to window 22, wherein an application program that supports the panning mode is being executed, and the third button is clicked, the operating mode enters the panning mode and the shape of the mouse pointer is varied. But while the condition in window 22 remains the same as the mouse pointer is moved to window 24, wherein an application that does not support the panning mode is being executed, when the third button is clicked in window 24 the shape of the mouse pointer will not change. As with the automatic scroll mode, if a window wherein the panning mode can be executed and a window wherein the panning mode cannot be executed are open on the same screen, a user may become confused.

As is described above, the conventional three-button mouse has the following problem. Specifically, since application programs are responsible for providing support for the various modes that can be implemented using the third button, if a window wherein a mode can be executed that is provided by the third button and a window wherein such a mode cannot be executed are open on the same screen, a user may become confused.

Logitech Corp. has proposed a technique whereby, in order to implement various modes allocated to the third button, a mouse event output by the third button is processed by a mouse driver. This removes the responsibility for the support of the above described modes being assigned to an application program. According to this technique, so long as a window is a scrollable window having a scroll bar, the scroll mode can be started simply by clicking the third button, regardless of the support of the application program. However, this technique can be used only for the scroll mode. According to this technique, when the third button is clicked, the scroll mode is implemented and a document is scrolled. When the third button is clicked again, the scroll mode is terminated. The relationship between the scrolling function and a change of the shape of the mouse pointer is as follows.

Clicking is a manipulative operation during which the button of a mouse is sequentially quickly depressed and released. Even when clicking is executed quickly, a system can easily identify the depression and release operations performed. Within the technique proposed by Logitech Corp., a distinction is made between these two manipulative operations. These distinctions are:

(1) When the third button is depressed, the execution of the scroll function is initiated.

(2) When the third button is released, the shape of the mouse pointer is changed but the continued execution of the scroll function is not affected.

(3) When the third button is depressed again, the continued execution of the scroll function and the changed shape of the mouse pointer are not affected.

(4) When the third button is thereafter released, the execution of the scroll function is halted and the mouse pointer is returned to its original shape.

As is apparent from the above description, a one-to-one correspondence does not exist between the condition whereunder execution of the scroll function is initiated and the condition where under the shape of the mouse pointer is changed. Since, as in (2) above, the shape of the mouse pointer is not affected until the third button is released. However, before the third button is released, a user cannot visually ascertain whether he or she has depressed the third button. Even though the user may be aware that he or she had depressed a certain button, the user receives no feedback to the effect that third button has been depressed since the shape of the mouse pointer has not changed. Therefore, even with the technique developed by Logitech Corp., when instead of depressing the right or the left button, the user mistakenly depresses the third button, he or she is not immediately made aware of it.

SUMMARY OF THE INVENTION

It is one object of the present invention to provide a method for displaying a mouse pointer for a three-button mouse that enables a user to easily ascertain when an incorrect button has been depressed, regardless of where the mouse pointer is located on a screen.

The present invention is provided to resolve the above described limitations. It should be noted, however, that applicability of the present invention is not limited to the mouse shown in FIG. 5, which is an external, computer device, but can also be applied for a built-in mouse located in the vicinity of the keyboard of a portable computer.

The present invention relates to a method and system for displaying a mouse pointer for a three-button mouse having a left button, a right button and a third button. The external force applied to the third button is detected and based on the result of the detection, a mouse function database is searched to determine a pertinent function. The mouse function database stores a plurality of data sets in compliance with a condition of the external force, wherein each data set represents a prescribed relationship between the external force and a function allocated to the third button. Based on the determination obtained for the pertinent function, a mouse pointer shape database is searched to determine the shape of the mouse pointer corresponding to the pertinent function. Then, based on the determination made for the shape of the mouse pointer in response to the external force, the current shape of the mouse pointer is changed.

As is described above and according to the present invention, in response to the external force applied to the third button of the mouse, the shape of the mouse pointer is changed. Consequently, since the fact that the external force has been applied to the third button of the mouse is transmitted visually as feedback to a user, the user can immediately ascertain that an incorrect button has been depressed. Furthermore, since the shape of the mouse pointer is changed regardless of where it is located on the screen, in contrast to the prior art, a location wherein the shape of a mouse pointer can be changed is not limited to a specific window. That is, when the mouse pointer of the three-button mouse is displayed in at least two windows and when the function of the third button cannot be executed in one of the windows, the shape of the mouse pointer in that window will be changed in response to the external force applied to the third button.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
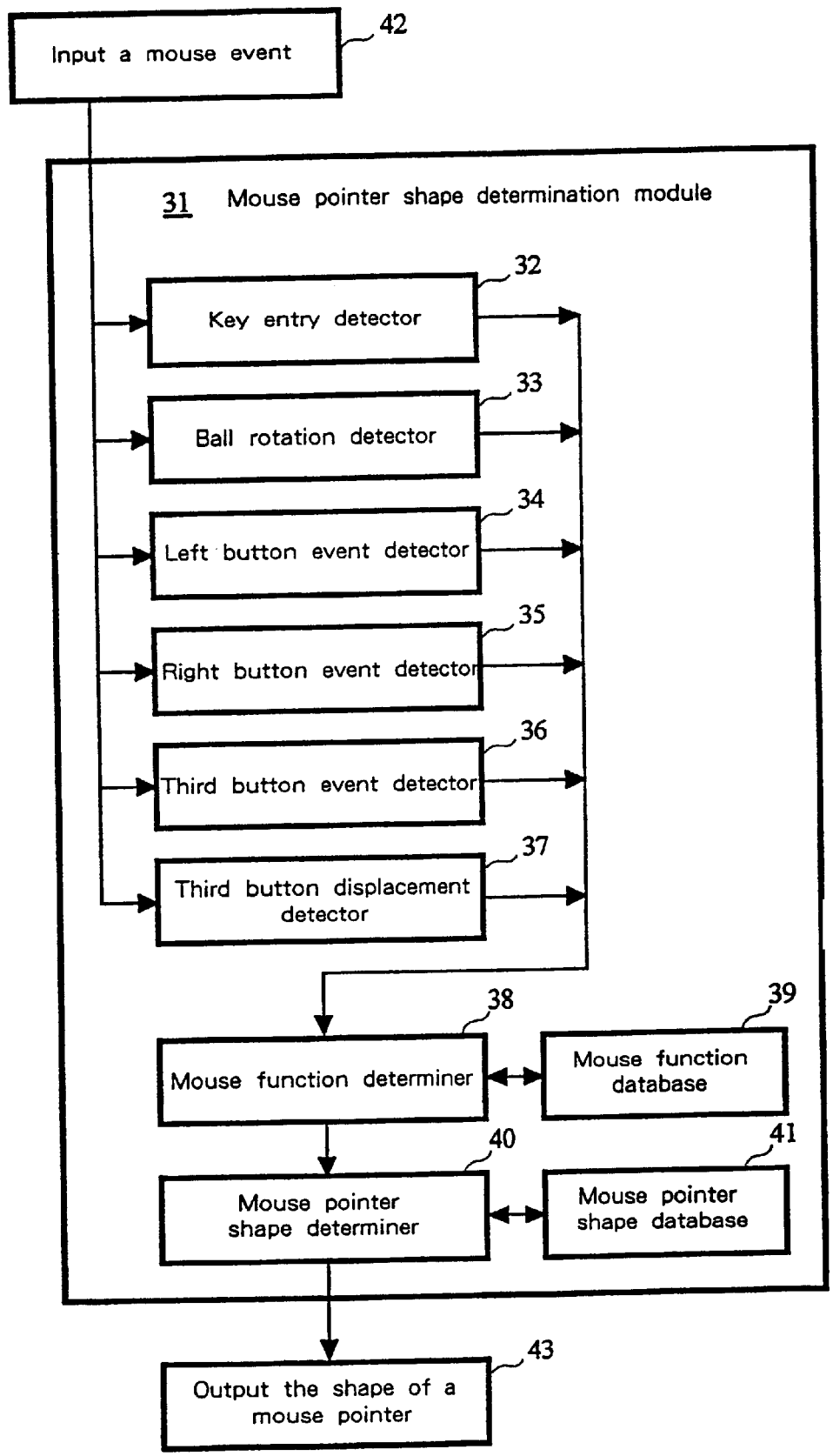
FIG. 1 is a diagram showing a mouse pointer shape determination module according to one embodiment of the present invention.

Turning now to FIG. 1, illustrated is a block diagram of an embodiment of a module for determining the shape of a mouse pointer according to the present invention. A mouse pointer shape determination module 31 includes a key entry detector 32, a ball rotation detector 33, a left button event detector 34, a right button event detector 35, a third button event detector 36, a third button displacement detector 37, a mouse function determiner 38, a mouse function database 39, a mouse pointer shape determiner 40, and a mouse pointer shape database 41. The key entry detector 32 detects the entry at a keyboard of a key entered at the same time as a mouse is manipulated. The ball rotation detector 33 detects the direction and the distance covered when a ball provided at the bottom of the mouse is rotated. The locations at which the elements in the X and Y directions intersect each other are detected to acquire the direction of rotation and the distance rotated by the ball.

The left button event detector 34 detects the depression and the release of the left button of the mouse. The right button event detector 35 detects the depression and the release of the right button of the mouse. The third button event detector 36 detects the depression and the release of the third button. The third button is a mouse component provided in addition to the left and the right buttons for the conversion into an electrical signal of an externally applied force. It should be noted that the term button is used here as a generic term. The third button can be similar in shape to the left and the right buttons or may be formed as a small rotary disk (e.g., a wheel). Alternatively, the third button can also be constructed like a stick having a hemispherical head, or a ball.

The third button displacement detector 37 detects the displacement (distance the third button is shifted from the static state) of the third button in the X and/or Y direction that, in turn, is used by the ball rotation detector 33 to detect the rotational direction and distance rotated by the ball. The mouse function database 39 is used to store the values detected by the detectors 32 to 37 and the mouse functions corresponding to combinations of these detected values. The mouse function related to the third button is set in advance by a user using typically a control panel (not shown) and this setup is stored in the mouse function database 39. To determine a mouse function, the mouse function determiner 38 searches the mouse function database 39 based on the values detected by the detectors 32 to 37.

The mouse pointer shape database 41 is used to store the mouse functions and the corresponding mouse pointer shapes. The mouse pointer shape determiner 40 searches the mouse pointer shape database 41 based on the mouse function determined by the mouse function determiner 38, and selects a mouse pointer shape corresponding to the pertinent mouse function.

The operation of the mouse pointer shape determination module 31 will now be described. Initially a mouse event 42 is entered in the mouse pointer shape determination module 31. A mouse event is a mouse precipitated event that results in a software state change. Recent OSs and applications are event-driven programs for processing such events upon their occurrence. Thus, when a mouse event 42 is entered, the detectors 32 to 37 perform their assigned individual detection processes. The detectors 32 to 37 perform their detection processes in parallel upon the entry of a mouse event and transmit the obtained results to the mouse function determiner 38. The mouse function determiner 38 thereafter uses the values detected by the detectors 32 to 37 to search the mouse function database 39 and to determine the identity of the mouse function. This will be described later in greater detail with reference to FIG. 2. The mouse pointer shape determiner 40 then uses the identity of the mouse function determined by the mouse function determiner 38 to perform a search of the mouse pointer shape database 41 to determine the shape of a mouse pointer corresponding to the pertinent mouse function. This will be described later in greater detail with reference to FIG. 3.

Figure 2:
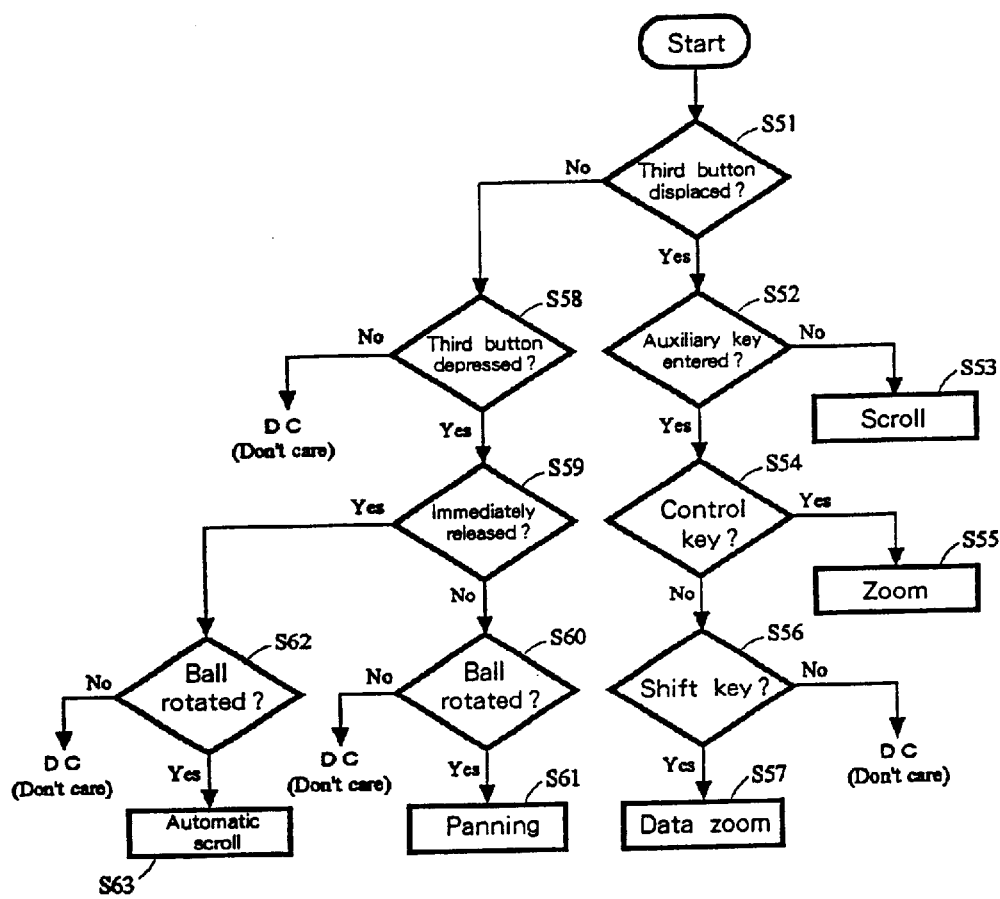
FIG. 2 is a flowchart showing the operation of the mouse function determiner in illustrated in FIG. 1.

Referring now to FIG. 2, there is depicted a flowchart showing the processing performed by the mouse function determiner 38. The operation of the mouse function determiner 38 will now be described while referring to FIG. 2. The mouse pointer is changed and assumes various shapes in accordance with mouse events not related to the third button. To represent, for example, the function "being executed," the mouse pointer assumes the shape of a hour glass in the Windows OS (Trademark) and the shape of a wrist watch in the Mac OS (Trademark). In the illustrated embodiment, an explanation will be given for the determination of a mouse event 42 related to the third button. However, since the mouse pointer is changed and assumes the shape of an hour glass or a wrist watch upon the occurrence of a mouse event 42 not related to the third button, no explanation for such an event will be given.

Initially, a check is performed to determine whether the third button has been displaced (step S51). If the decision is Yes, program control advances to step S52. On the other hand, if the decision is No, program control moves to step S58. At step S52, a check is performed to determine whether an auxiliary key was depressed at a keyboard at the same time as when the third button was displaced. If the decision is Yes, program control advances to step S54. If the decision is No, program control goes to step S53, whereat the function of the mouse is determined to be "scrolling." "Scrolling" is a function for moving data vertically or horizontally within a display range (e.g., a window) so as to sequentially display the contents of a document that cannot in its entirety be displayed at one time.

At step S54, a check is performed to determine whether the auxiliary key detected at step S52 is a control key. If the decision is No, program control moves to step S56. If the decision is Yes, program control advances to step S55, whereat the function of the mouse is determined to be "zooming." "Zooming" is a function for reducing or increasing the size of the contents of a document displayed on a screen. At step S56, a check is performed to determine whether the auxiliary key detected at step S52 was a shift key. If the decision is No, the determination of the mouse function is not performed, i.e., a so-called "Don't care" response is selected. As is described above, the explanation given here concerns the determination of a mouse event 42 related to the third button. Therefore, in this case, it cannot be assumed that the shape of the mouse pointer is not changed, even though a "Don't care" response was selected. If the decision is Yes, program control advances to step S57, whereat the function of the mouse is determined to be "data zooming." "Data zooming" is a function whereby data may be folded and hidden, and later reopened and displayed. When this function is applied for a WWW browser, a "return" or "advance" function can be performed quickly.

When displacement of the third button is not detected at step S51 (No), program control goes to step S58. At step S58, a check is performed to determine whether the third button has been depressed. If the decision is Yes, program control advances to step S59.

On the other hand, if the decision is No, it means "Don't care," and the determination of the mouse function is not performed. At step S59, a check is performed to determine whether the third button has been immediately released. If the decision is No, program control advances to step S60, and if the decision is Yes, program control moves to step S62.

At step S60, a check is performed to determine whether the ball that partially projects downward from the bottom of the mouse has rotated. Rotation of the ball generally means that the mouse has been moved. And if the decision is No, it means "Don't care," and the determination of the mouse function is not performed. However, if the decision is Yes, program control advances to step S61, whereat the function of the mouse is determined to be "panning." "Panning" is a function whereby a document is sequentially scrolled at an arbitrary speed in an arbitrary direction.

At step S62, a check is performed to determine whether the ball has been rotated. If the decision is No, it means "Don't care," and the determination of the mouse function is not performed. But if the decision is Yes, program control advances to step S63, whereat the function of the mouse is determined to be "automatic scrolling." "Automatic scrolling" is a function whereby a document is scrolled automatically.

Figure 3:
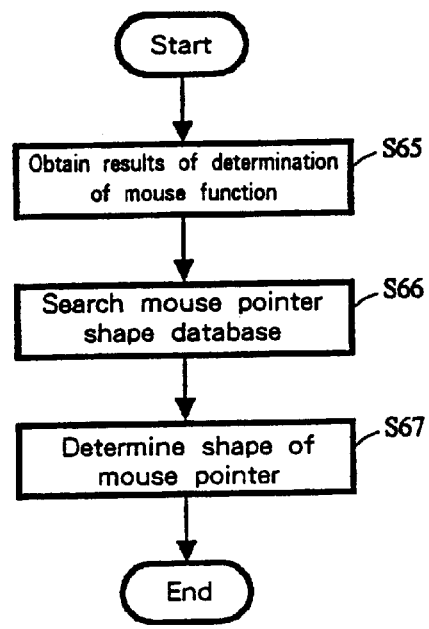
FIG. 3 is a flowchart showing the operation of the mouse pointer shape determiner illustrated in FIG. 1.
Figure 5:
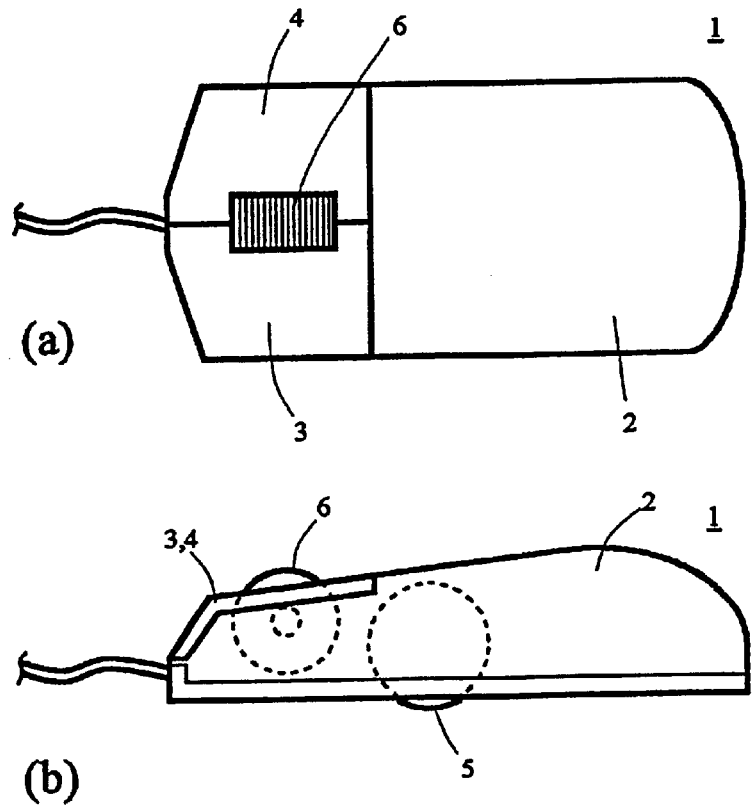
FIG. 5 is a diagram showing a three-button mouse.

Turning now to FIG. 3, there is depicted a flowchart showing the processing performed by the mouse pointer shape determiner 40. The processing performed by the mouse pointer shape determiner 40 will now be described while referring to FIG. 3. As explained herein above, with reference to the flowchart in FIG. 2, a mouse event 42 that occurs as a result of the manipulation of the third button is determined by the mouse function determiner 38 to be one of five mouse functions. At the first step, S65, the mouse pointer shape determiner 40 obtains the results of the mouse function determination performed by the mouse function determiner 38.

At step S66, the mouse pointer shape database 41 is searched based on the results of the mouse function determination. Within the mouse pointer shape database 41 are stored mouse functions and their corresponding mouse pointer shapes. The shape of the mouse pointer corresponding to the mouse function uses a metaphor (a specific object that metaphorically represents an abstract concept) for a pertinent mouse function. As a result of the search, a mouse pointer shape is extracted that corresponds to the pertinent mouse function.

At step S67, the shape of the mouse pointer extracted at step S66 is determined to be the shape that represents the pertinent mouse function. This result is outputted as a mouse pointer shape 43. The mouse pointer shape 43 is transmitted to the OS, and the OS permits the graphic display mechanism to immediately display the mouse pointer using the shape 43, instead of the ordinary shape, at the location on the display screen of the mouse pointer having the ordinary shape. That is, as soon as the third button is depressed or displaced, the shape of the mouse pointer is altered. For this display, the mouse pointer can be positioned anywhere on the screen, i.e., the mouse pointer does not have to be located in a specific window.

Figure 7:
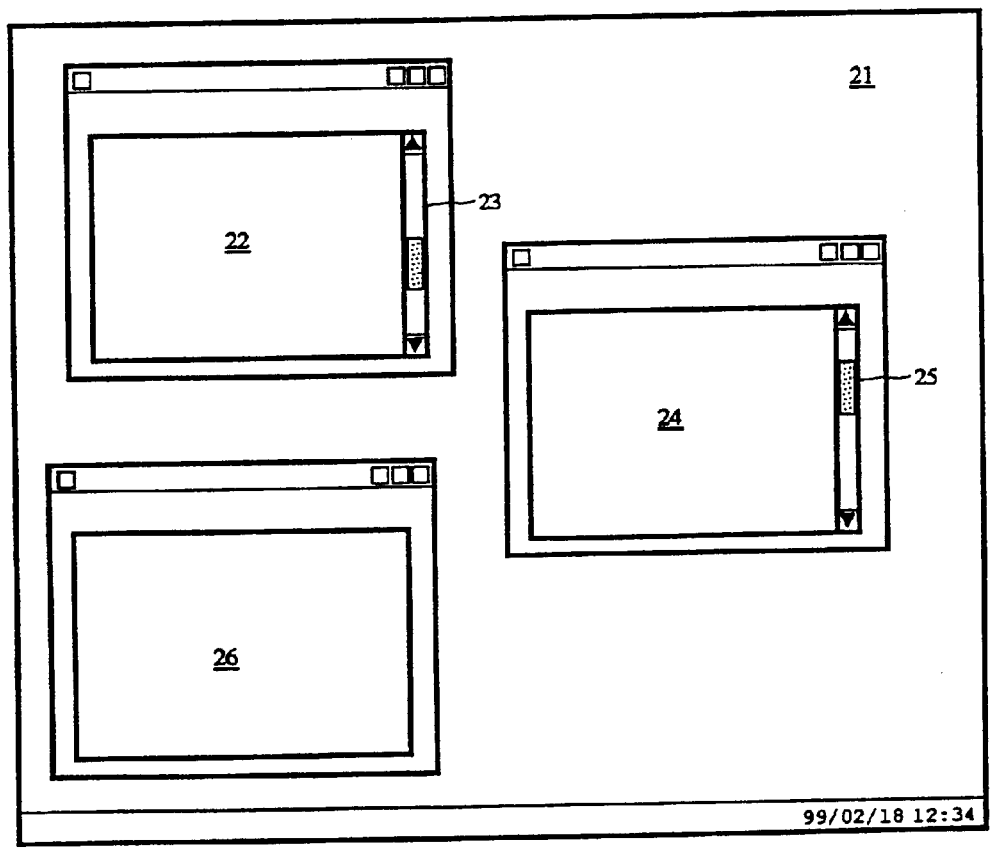
FIG. 7 is a diagram showing the state wherein windows are opened on a desktop.

A specific explanation will be now given with reference to FIG. 7. Since windows 22 and 24 include scroll bars 23 and 25, these windows are scrollable. Window 26 does not include a scroll bar, it is not a scrollable window. Assuming that an application that supports the scroll function of the third button is being executed in window 22 and an application that does not support the scroll function is being executed in window 24. According to the prior art, when the third button is depressed or displaced while the mouse pointer is in window 22, the shape of the mouse pointer is altered. However, when the third button is depressed or displayed while the mouse pointer is located in the window 24 or 26, the shape of the mouse pointer is not changed. Therefore, the user is not aware that the third button may have been erroneously depressed or displaced.

With the practice of the present invention, however, when the third button is depressed or displaced, the shape of the mouse pointer is immediately altered, regardless of where the mouse pointer is located on the screen. Therefore, when the third button is depressed or displaced while the mouse pointer is located in either window 24 or 26, the shape of the mouse pointer is changed. Additionally, when the third button is depressed or displaced while positioned on the desktop 21, the shape of the mouse pointer is also altered. Accordingly, the fact that the third button of the mouse has been depressed or displaced can be fed back to the user visually.

When a user prepares to depress a button on a mouse, he or she tends to position the mouse pointer near an object, such as an icon, that can be clicked on or at a location at which the user can click the mouse (e.g., when the right button is clicked near an icon to open the icon's pop-up menu). Additionally, while the user is positioning the mouse, the user is typically looking intently at the mouse pointer. In this situation, if the user mistakenly depresses or displaces the third button, the shape of the mouse pointer is immediately changed, and the changed shape of the mouse pointer is fed back to the user visually. This visual feedback provides an excellent source of information for the user who is intently observing the mouse pointer that he had mistakenly depress/displace the third button. Thus, when a user has mistakenly depressed or displaced the third button, the result of the error is fed back to the user visually, so that he or that she is immediately aware of it. As a result, the degree of concentration required of the user to avoid depressing the wrong button is drastically reduced.

Furthermore, when a plurality of functions (modes) are allocated to the third button, the mouse pointer assumes a shape (the metaphor for a function) that corresponds to a function. A user can identify an active function merely by depressing or displacing the third button. Therefore, even if a user does not know in detail how to manipulate the third button, he or she can immediately identify an active function from the shape of the mouse pointer actually displayed when the third button is depressed or displaced. As a result, to ascertain which function is active, contrary to the prior art, the physical effort needed to actually move a mouse is not required and the load imposed on a user is reduced.

Various programming languages may be used to prepare a program for the mouse pointer display method according to the present invention. This program can be stored in a storage device, such as a ROM, mounted in a computer system; on a portable recording medium, such as a floppy disk (FD), a CD-ROM (a read only memory using a compact disk), or an MO (magneto-optical) disk; or in an external storage device provided for a server computer connected to a network.

Figure 4:
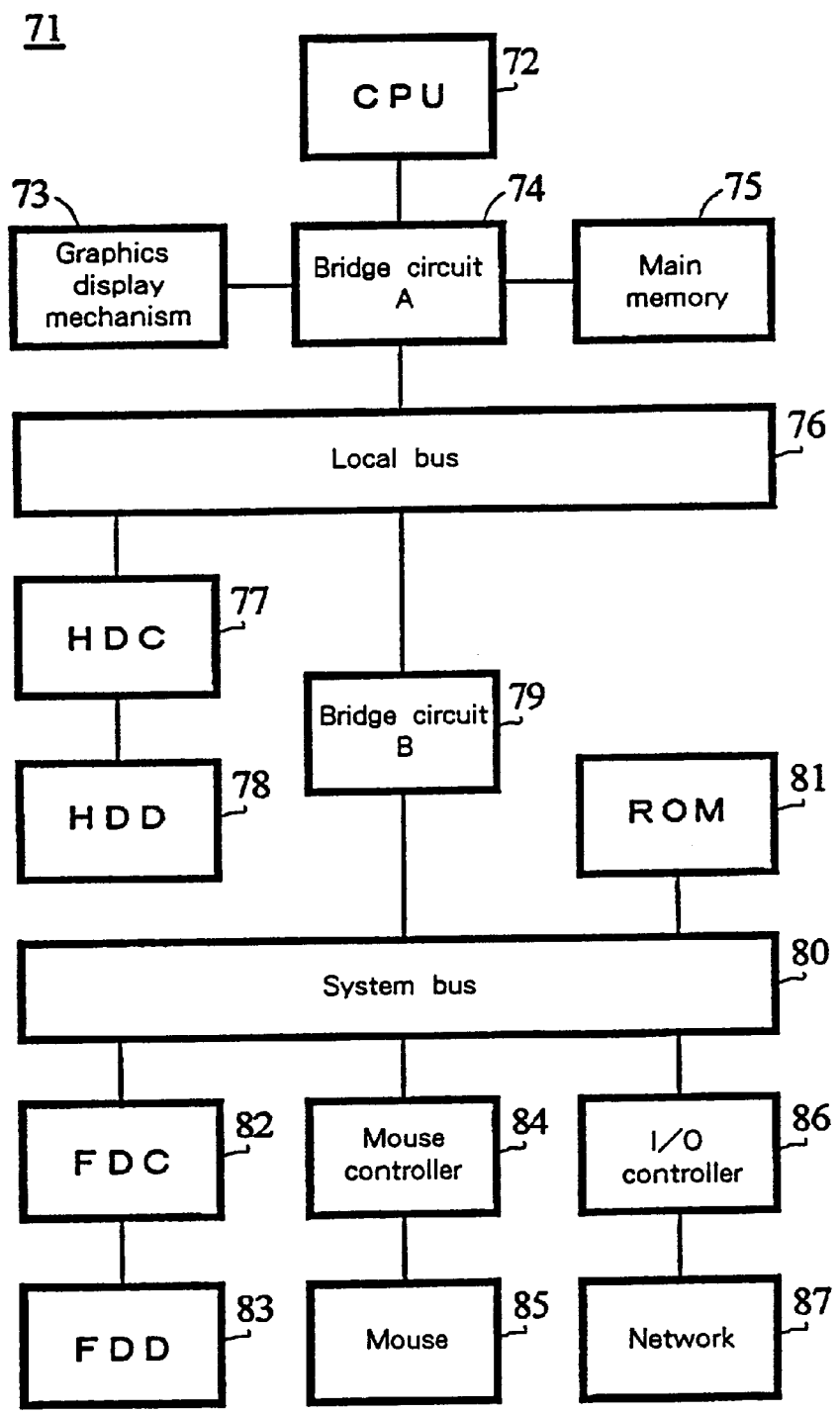
FIG. 4 is a diagram showing a computer system that performs a mouse pointer displaying method according to the present invention.
Figure 6:
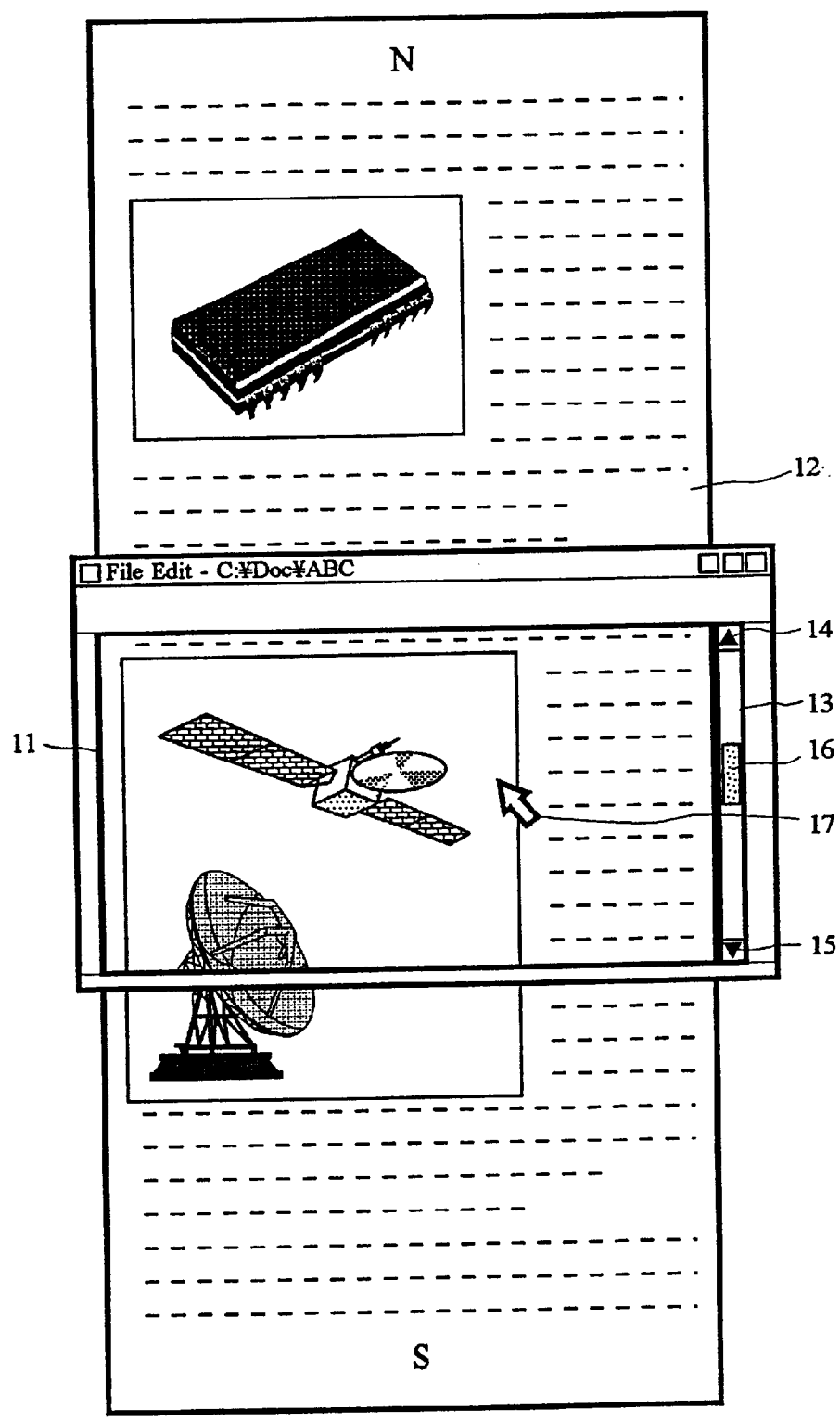
FIG. 6 is a diagram showing the state wherein a document is displayed in a window on a computer screen.

An exemplary computer system for implementing the mouse pointer displaying method according to the present invention will now be described with reference to FIG. 4. A computer 71 in FIG. 4 essentially comprises: a CPU 72, a graphics display mechanism 73, a bridge circuit A 74, a main memory 75, a local bus 76, a hard disk drive controller HDC 77, a hard disk drive HDD 78, a bridge circuit B 79, a system bus 80, a ROM (Read Only Memory) 81, a floppy disk drive controller FDC 82, a floppy disk drive FDD 83, a mouse controller 84, a mouse 85, an I/O (input/output) controller 86, and a network 87. The CPU 72 may be a microprocessor, such as the Pentium II (Trademark) by Intel Corp. or the PowerPC (Trademark) by Motorola Corp. and IBM Corp. The local bus 76 is a bus for connecting a peripheral device, such as the hard disk drive HDD 78, operated at a high speed, and is, for example, a PCI (Peripheral Component Interconnect) bus. The PCI bus has a local bus architecture that is determined by the PCI special interest group (a standardization group of which a hundred some odd companies, such as Intel Corp., IBM Corp. and Compaq Corp., are members).

The system bus 80 is used for the connection of peripheral devices, such as the floppy disk drive FDD 83 and the mouse 85, operated at a low speed, and is, for example, an ISA (Industry Standard Architecture) bus. The ISA bus is an expansion bus that has been established as an international standard based on an expansion bus adopted for the PC/AT personal computers of IBM Corp. The CPU 72 is connected to the local bus 76 by the bridge circuit A 74. The bridge circuit A 74 is constituted by, for example, a memory/PCI control chip set. The graphics display mechanism 73 controls the output to a display device, such as a CRT (Cathode Ray Tube) or an LCD (Liquid Crystal Display). The graphics display mechanism 73 and the bridge circuit A 74 are connected by, for example, an AGP (Accelerated Graphics Port) bus. The AGP bus is an improved, dedicated PCI bus for the connection of a circuit, such as a graphics card, associated with an image display. The local bus 76, which is connected to the system bus 80 by the bridge circuit B 79, is constituted by, for example, a PCI-ISA bridge chip. The hard disk drive HDD 78 is used to store various programs, including the operating system (OS). A system program, such as the OS, and application programs can be stored in another storage device, such as the ROM 81.

The operation of the computer 71 shown in FIG. 4 will now be described. As is described above, various programming languages can be used to prepare a program for the mouse pointer display method of this embodiment (hereinafter this program is called a "mouse pointer displaying program"). In the illustrated embodiment, a computer readable recording medium is used to store the mouse pointer displaying program. The recording medium can be a storage device mounted in a computer system, such as ROM (Read Only Memory), a EEPROM (Electrically Erasable Programmable Read Only Memory) or a flash EEPROM; a portable recording medium, such as a floppy disk (FD), a CD-ROM (a read only memory using a compact disk), or an MO (magneto-optical) disk; or a filing device provided for a server computer connected to a network.

The computer 71 fetches the stored mouse pointer displaying program from the recording medium in the following manner. If the recording medium is a storage device mounted in the computer 71, two methods are used to fetch the mouse pointer displaying program. If the recording medium is a read only memory, such as a ROM, the power management program is burnt in the ROM during the semiconductor fabrication process, and the ROM is mounted in the computer 71 (the ROM 81 in FIG. 4 serves as an example in this instance). If the recording medium is a portable recording medium, such as a floppy disk (FD), to read the program the FD on which the mouse pointer displaying program is stored is inserted into the FDD 83. Then, the mouse pointer displaying program is stored on the HDD 78. The same process is performed for other portable recording mediums, such as CD-ROMs or MO disks. In other words, the portable recording medium is inserted into a dedicated reader, and the stored mouse pointer displaying program is read. If the recording medium is an external storage device on a network 87, the mouse pointer displaying program is downloaded from the external storage device across the network 87 and is stored on the HDD 78. The mouse pointer displaying method thus fetched by the computer 71 is executed under the control of the operating system (OS).

From the foregoing discussion, it should be apparent that the present invention for displaying a mouse pointer provides the following effects. When the third button is depressed or displaced, the shape of the mouse pointer is changed, regardless of where it is located on the screen. Thus, visual feedback is used to notify a user that the third button of the mouse has been depressed or displaced. When a user mistakenly depresses or displaces the third button, visual feedback immediately apprises him or her of the occurrence of the error. Thus, the error notification process is easily performed. As a result, the degree of concentration required of the user to avoid the depression of the wrong button is drastically reduced. When a plurality of functions (modes) are allocated to the third button, the mouse pointer assumes a shape (the metaphor for a function) that corresponds to a function. Thus, a user can identify an active function merely by depressing or displacing the third button. Therefore, even if a user does not know in detail how to manipulate the third button, he or she can immediately identify an active function from the shape of the mouse pointer actually displayed when the third button is depressed or displaced. As a result, to ascertain which function is active, contrary to the prior art, the physical effort needed to actually move a mouse is not required thus reducing the load imposed on a user.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for displaying a mouse pointer for use with a three-button mouse having a left button, a right button and a third button, said method comprising the steps of:

detecting an external force applied to said third button;

determining a pertinent function allocated to said third button, based on the results of said detection, by searching a mouse function database;

determining a shape of said mouse pointer corresponding to said pertinent function, based on the determination of said pertinent function, by searching a mouse pointer shape database storing a plurality of data sets, each data set representing a prescribed relationship between said pertinent function allocated to said third button and said shape of said mouse pointer; and varying a shape of said mouse pointer being displayed based on said determination of said shape of said mouse pointer.

2. The method as recited in claim 1, wherein said mouse function database stores a plurality of data sets in compliance with the condition of said external force, each data set representing a prescribed relationship between said external force applied to said third button and said pertinent function allocated to said third button.

3. The method as recited in claim 2, wherein said mouse pointer is displayed in at least two windows and said third button is disabled from functioning in one window of said at least two windows, said step of varying a shape of said mouse pointer further includes the step of varying a shape of said mouse pointer in said window wherein said third button being disabled from functioning.

4. The method as recited in claim 1, further including the step of detecting the rotation of a ball provided at the bottom of said mouse, and wherein said step of determining a pertinent function is further based on said rotation of said ball.

5. The method as recited in claim 4, wherein said mouse function database stores a plurality of data sets in compliance with the condition of said external force and said rotation of said ball, each data set representing a prescribed relationship between said external force applied to said third button and said rotation of said ball, and said function allocated to said third button.

6. The method as recited in claim 1, wherein said external force is a depressing force applied to said third button.

7. The method as recited in claim 1, wherein said external force is a displacing force applied to said third button.

8. A computer program product, comprising:

a computer-readable recording medium having stored thereon computer executable instructions for displaying a mouse pointer for use with a three-button mouse having a left button, a right button and a third button, said computer executable instructions when executed, perform the steps of:

detecting an external force applied to said third button;

determining a pertinent function allocated to said third button, based on the results of said detection, by searching a mouse function database;

determining a shape of said mouse pointer corresponding to said pertinent function, based on the determination of said pertinent function, by searching a database storing a plurality of data sets, each data set representing a prescribed relationship between said function allocated to said third button and said shape of said mouse pointer; and varying a shape of said mouse pointer being displayed, in response to said external force, based on said determination of said shape of said mouse pointer.

9. The computer program product as recited in claim 8, wherein said mouse function database stores a plurality of data sets in compliance with the condition of said external force, each data set representing a prescribed relationship between said external force applied to said third button and said pertinent function allocated to said third button.

10. The computer program product as recited in claim 9, wherein said mouse pointer is displayed in at least two windows and said third button is disabled from functioning in one window of said at least two windows, said step of varying a shape of said mouse pointer further includes the step of varying a shape of said mouse pointer in said window wherein said third button being disabled from functioning.

11. The computer program product as recited in claim 8, further including the step of detecting the rotation of a ball provided at the bottom of said mouse, and wherein said step of determining a pertinent function is further based on said rotation of said ball.

12. The computer program product as recited in claim 11, wherein said mouse function database stores a plurality of data sets in compliance with the condition of said external force and said rotation of said ball, each data set representing a prescribed relationship between said external force applied to said third button and said rotation of said ball, and said function allocated to said third button.

13. The computer program product as recited in claim 8, wherein said external force is a depressing force applied to said third button.

14. The computer program product as recited in claim 8, wherein said external force is a displacing force applied to said third button.

15. A computer system comprising:

a CPU;

a main memory;

an external storage device;

a peripheral device;

a bus that interconnects said CPU, main memory, external storage device and peripheral device; and means for displaying a mouse pointer for use with a three-button mouse having a left button, a right button and a third button, including:

means for detecting an external force applied to said third button;

means for determining a pertinent function allocated to said third button, based on the results of said detection, by searching a mouse function database;

means for determining a shape of said mouse pointer corresponding to said pertinent function, based on the determination of said pertinent function, by searching a mouse pointer shape database storing a plurality of data sets, each data set representing a prescribed relationship between said pertinent function allocated to said third button and said shape of said mouse pointer; and means for varying a shape of said mouse pointer being displayed based on said determination of said shape of said mouse pointer.

16. The computer system as recited in claim 15, wherein said mouse function database stores a plurality of data sets in compliance with the condition of said external force, each data set representing a prescribed relationship between said external force applied to said third button and said pertinent function allocated to said third button.

17. The computer system as recited in claim 16, wherein said mouse pointer is displayed in at least two windows and said third button is disabled from functioning in one window of said at least two windows, said means for varying a shape of said mouse pointer further includes means for varying a shape of said mouse pointer in said window wherein said third button being disabled from functioning.

18. The computer system as recited in claim 15, further including means for detecting the rotation of a ball provided at the bottom of said mouse, and wherein said means for determining a pertinent function is further based on said rotation of said ball.

19. The computer system as recited in claim 18, wherein said mouse function database stores a plurality of data sets in compliance with the condition of said external force and said rotation of said ball, each data set representing a prescribed relationship between said external force applied to said third button and said rotation of said ball, and said function allocated to said third button.

20. The computer system as recited in claim 15, wherein said external force is a depressing force applied to said third button.

21. The computer system as recited in claim 15, wherein said external force is a displacing force applied to said third button.

22. The computer system as recited in claim 15, further including a network linking device.

* * * * *